(No Model.)  3 Sheets—Sheet 1.

H. A. LEONARD & G. KETTLEWELL.
STOP WATCH.

No. 379,963. Patented Mar. 27, 1888.

Witnesses
G. B. Thomas,
J. H. Mittendorff

Inventors
Harry A. Leonard, and
Gover Kettlewell.
by their Attorneys.
Price & Stewart.

(No Model.) 3 Sheets—Sheet 2.

H. A. LEONARD & G. KETTLEWELL.
STOP WATCH.

No. 379,963. Patented Mar. 27, 1888.

Witnesses.
G. B. Thomas,
J. H. Mittendorf.

Inventors.
Harry A. Leonard and
Gover Kettlewell.
by their Attorneys.
Price & Stuart (No Model.) 3 Sheets—Sheet 3.
H. A. LEONARD & G. KETTLEWELL.
STOP WATCH.
No. 379,963. Patented Mar. 27, 1888.
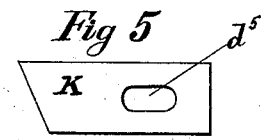
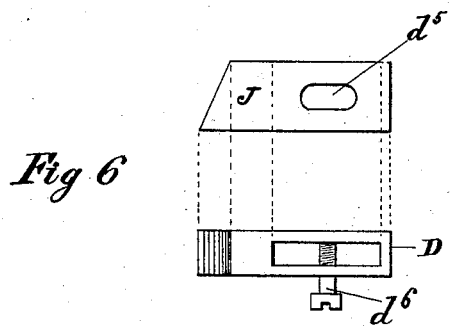
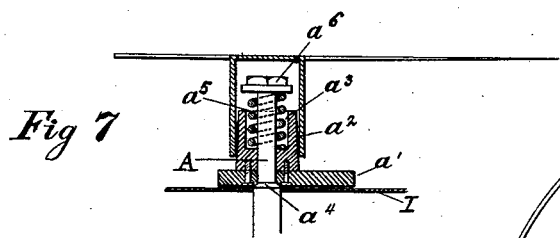
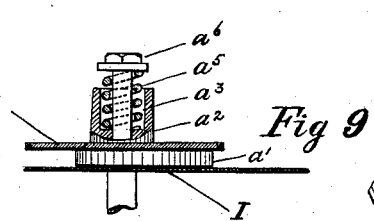
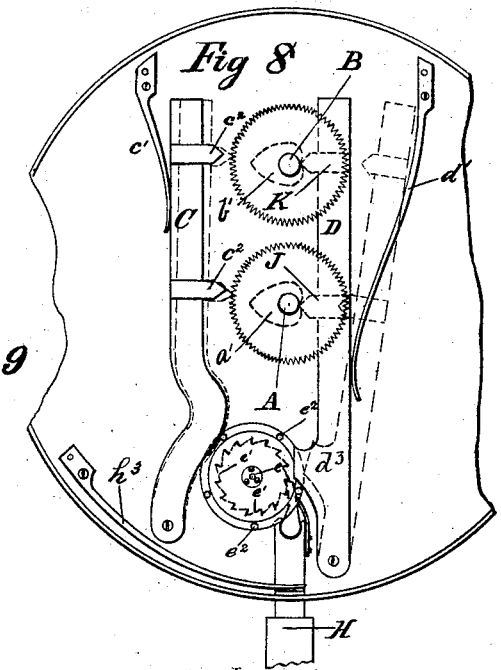
Witnesses,
G. B. Thomas.
J. H. Mittendorff.
Inventors,
Harry A. Leonard
and Gover Kettlewell
by their Attorneys.
Price & Stewart.

UNITED STATES PATENT OFFICE.

HARRY A. LEONARD AND GOVER KETTLEWELL, OF BALTIMORE, MARYLAND, ASSIGNORS OF ONE-THIRD TO RICHARD S. CULBRETH, OF SAME PLACE.

STOP-WATCH.

SPECIFICATION forming part of Letters Patent No. 379,963, dated March 27, 1888.

Application filed January 20, 1887. Serial No. 224,972. (No model.)

*To all whom it may concern:*

Be it known that we, HARRY A. LEONARD and GOVER KETTLEWELL, citizens of the United States, residing at Baltimore city, in the State of Maryland, have invented certain Improvements in Stop-Watches or Timers Designed for Use upon Buggies, Sulkies, and other Vehicles, of which the following is a full and complete description.

The drawings which accompany the description illustrate our invention, of which—

Figure 1:
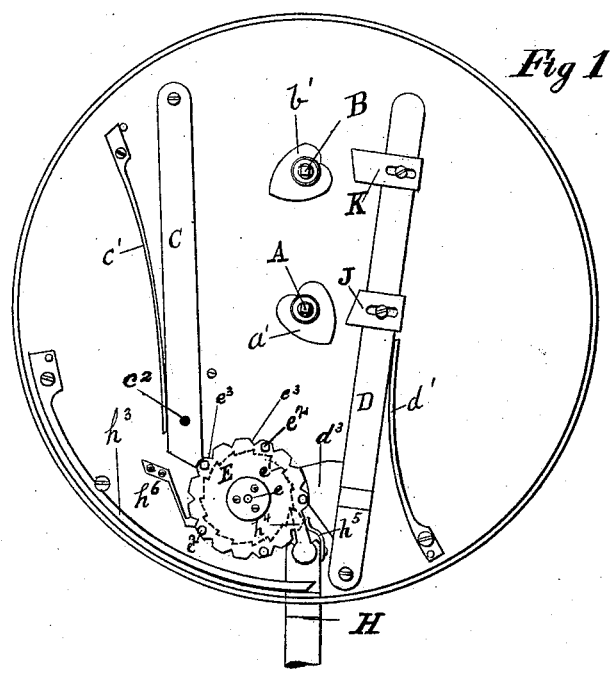
Figure 2:
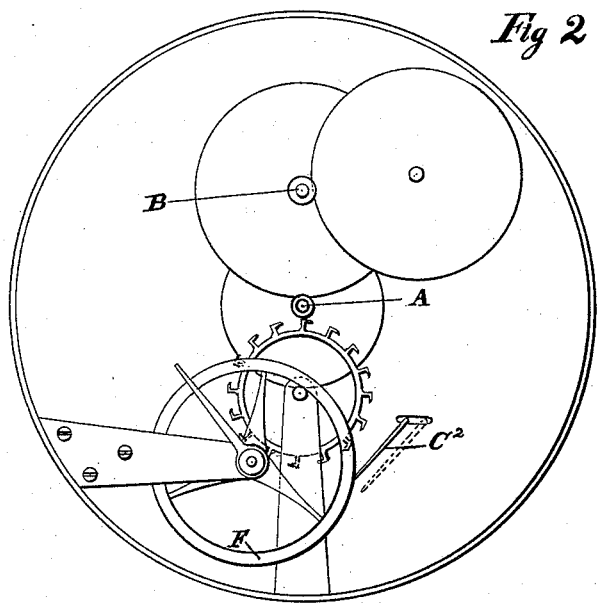
Figure 3:
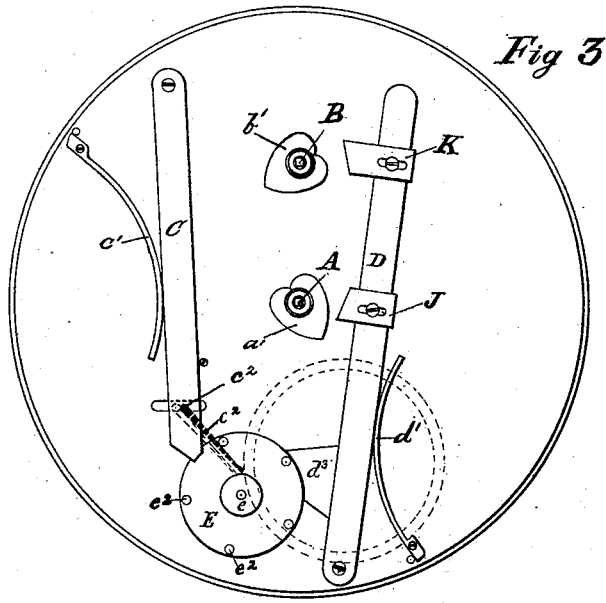
Figure 4:
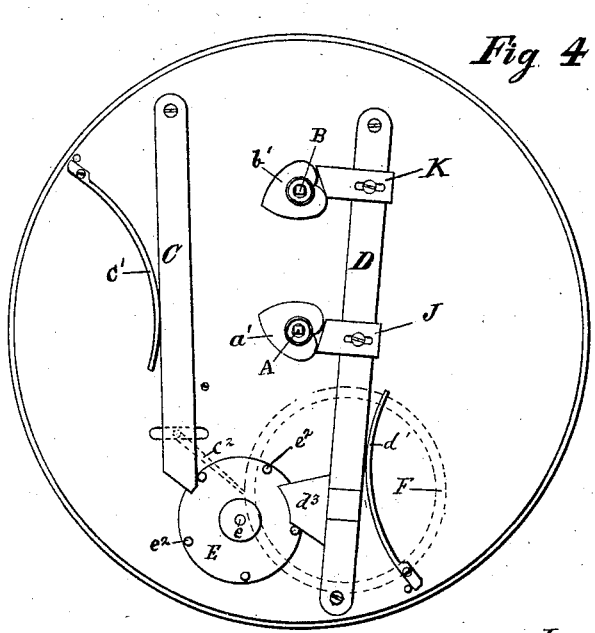

Figure 1 is a view of the interior of the timer, showing the levers, cams, pin-wheel, and springs. This figure illustrates the position of the parts with the mechanism released and the timer running. Fig. 2 is a reverse view of the timer, showing the time-train and the stopping-bar in position to engage the balance-wheel and stop the device. Fig. 3 shows the parts which operate upon the balance-wheel, with the lever released from the pin and the arm resting upon the balance-wheel. In this view the train is stopped and the hands of the dial would indicate the number of minutes and seconds consumed during the time the timer was running. Fig. 4 shows the lever with its ratchets resting upon the heart-shaped cams. In this position the hands of the dial will stand at the starting-point and ready to be started for timing. Figs. 5 and 6 illustrate the stops or offsets upon the lever D, provided with slots for adjusting them to operate in conjunction upon the heart-shaped cams. Fig. 7 shows the arbor upon which the hands are placed, with its bushing and mechanism upon which the stops operate to return the hands to position and fix them in place. Fig. 8 is a view of a modified form of stopping device in which the train runs continuously, but the hands are stopped by arresting the motion of the serrated wheel, which is released when they are to be reset. Fig. 9 is an elevation of one of the hand-arbors, showing the cam and serrated disk.

The object of our invention is to simplify the construction of timers for timing horses or other similar purpose, and the special features of the invention are: a device for stopping the hands and resetting them without stopping the train, a device for stopping the hands by stopping the train and then resetting them without disturbing the train, the arrangement of cams and hands upon the main driving-shafts of the train, new forms of construction for operating the several parts of the timer, a tension device upon the cams, and means for adjusting the cams and stops upon the levers.

Viewing Fig. 1, A represents the spindle upon which is mounted the seconds-hand, and B the spindle upon which is mounted the minute-hand. The spindle A carries the heart-shaped cam $a'$ and the spindle B the heart-shaped cam $b'$. Suitably pivoted to a part of the frame-work of the timer are the levers C and D. The springs $c'$ $d'$ bear upon these levers and exert a pressure upon them in the direction of the heart-shaped cams and pin-wheel.

The pin-wheel E is mounted upon the spindle $e$, which is suitably journaled in a plate which divides the time-train from the timer mechanism. Upon this spindle is also mounted and secured to the pin-wheel the ratchet-wheel $e'$, having fifteen teeth—three for each pin. (Shown in dotted lines in Fig. 1.) Upon the wheel E, arranged upon its surface near the periphery, is a series of pins, $e^2$. The number of pins varies according to circumstances. The drawings show five. These pins work against and in conjunction with the lever C and the cam $d^3$, and as the wheel E is turned the pins impart a reciprocating movement to the levers C and D, moving these levers away from the pin-wheel and heart-shaped cams, allowing them to remain at rest and again to drop into place to stop the timer or return the hands to zero.

The wheel E is operated by the following mechanism: A stem, H, arranged to slide in suitable guides erected upon a part of the frame-work of the timer, moves horizontally or in the direction of its length. The movement of this stem is limited to correspond with the distance between the pins $e^2$ and the required movements at any one time of the levers C and D. This movement of the stem is regulated by a shoulder on the stem H, which comes in contact with the frame of the timer when the stem is thrust in as far as it will go, and when the pressure upon it is removed it is returned to its starting-point by the spring $h^3$. The stem H carries the pivoted pawl $h^4$, which engages with the ratchet $e'$ and is held in its place upon the ratchet by the spring $h^5$. It will thus be seen that by thrusting the stem H inwardly the wheel E is turned partly upon its axis and remains stationary, held by the pawl $h^6$, when the stem is forced back and the pawl $h^4$ engages with another tooth of the ratchet.

The edge of wheel E is provided with V-shaped notches $e^3$, of the same number and corresponding position with the teeth of the ratchet $e'$, which are engaged by the spring-pawl $h^6$, thus holding the wheel stationary at all times, except when moved by the action of the stem H upon the ratchet $e'$. The space of these V-shaped notches and their pawl is such that when the wheel is turned by the stem the pawl will be raised out of its notches and will rest upon the periphery of the wheel until another notch is presented.

The lever C is suitably journaled in the frame of the timer. Its farther end is in the path of the pins of wheel E and engages one of them when it passes. A spring, $c'$, acts upon this lever, exerting a pressure in the direction of the wheel E. From the under side of this lever protrudes a rod or bar, $c^2$, which is extended at such an angle as to engage the edge of the balance-wheel of the train when the lever C is in one position. F is the balance-wheel of the time-train.

When a pin, $e^2$, of the pin-wheel engages the end of lever C, it will push it out to the limit of its motion, and by so doing disengage the rod $c^2$ from the balance-wheel of the train and allow it to start and run. As the pin-wheel E is turned by the stem H until a pin passes the end of the lever C, the lever C drops by the pressure of the spring $c'$ between the pin which has just passed its end and the one immediately behind it. This movement throws the end of the rod $c^2$ against the balance-wheel F and stops the train. The cam $d^3$ on the lever D operates in conjunction with the pins $e^2$ in a similar manner. So long as this cam is in contact with one of the pins the stops are kept away from the heart-shaped cams on the hand-arbors; but when the revolution of the wheel E causes the pin to pass the end of the cam $d^3$ the lever D drops, and the spring $d'$, forcing it down, throws the stops against the heart-shaped cams, turning them and the hands which are mounted upon them back to the starting-point or zero. The cam $d^3$ is formed as shown in Fig. 1. Its face is narrower than the distance between two of the pins on the pin-wheel and is concentric in shape with the circle of their movement, so that when the pin-wheel is turned by the ratchet to stop the train the lever D will remain stationary so long as the face of the cam rests upon the pin.

The mechanism for mounting the cams $a'$ and $b'$ and the manner in which they are mounted upon their driving-arbors we will now describe.

In Fig. 7 the arbor A, which carries the seconds-hand and is a duplicate of that carrying the minute-hand of the timer, projects up through the plate I. Just above the plate a shoulder is turned upon the arbor, as shown at $a^4$. Over the upper end of the spindle is passed the heart-shaped cam $a'$. From the upper surface of this cam and rigidly attached to it projects the cone-shaped piece $a^2$, which is provided with the socket $a^3$. Into this socket is placed a small spiral spring, $a^5$, and upon the end of the spindle is secured the nut $a^6$. It is preferable to have a double nut, in order that they may be readily fixed and set in position when adjusted. It will be seen by this arrangement that when the nut is screwed down the lower surface of the heart-shaped cams will rest upon the shoulder $a^4$ on the spindle and will not touch the plate I. Over the cone-shaped projection $a^2$ the sleeve or cylinder to which the hand is attached is placed. The sleeve, fitting tight to the cone, holds the hand in position. The friction of the shoulder $a^4$ on the lower face of the heart-shaped cam, induced by the pressure of the spring $a^5$, is sufficient to turn the cam and hand with the spindle when it turns while the train is running. When the stops J and K are forced against the heart-shaped cams, they are turned, and with them the hands, to their primary position, or zero. At the time at which this operation is performed the train is stationary, as here shown; or, if a different arrangement is used, it may continue to run. It will be seen that a very delicate adjustment of the cams on the spindles is necessary, in order that while the train is running free with the hands there may be no slipping of the cams on the shafts, while when the cams and hands are returned to their primary position they may move with ease and precision without disturbance of the train, whether the train be stationary or moving. For this purpose the tension device above described is provided.

In order that the stops should perform their work correctly, it is necessary that they should work together. In other words, a train which operates a minute and a seconds hand should be arranged so that both hands will be at zero when ready to start, both work together when started, and both be returned to zero together. The stops J and K should therefore be regulated to produce these return actions simultaneously. Both should bear upon their respective cams and act together. To accomplish this they are made adjustable upon the lever D in the direction of their length or crosswise of the lever D, as shown in Figs. 5 and 6. These stops are slotted to receive the lever, and are also slotted as shown at $d^5$. A set-screw, $d^6$, serves to hold the stops in position when adjusted by this arrangement. It will be seen that these stops may be adjusted and fixed to operate at the same moment upon the cams, and also to regulate them at proper distances upon the lever D.

The operation of the device is as follows: Beginning with the timer, with its mechanism in the position shown in Fig. 4, the hands of the dial are at zero. The ordinary mechanism or train of a watch or clock (shown in Figs. 1 and 2) turns the spindle A at the rate of one entire revolution in a minute and the spindle B at the rate of one entire revolution in ten minutes. In the position shown by the mechanism in Fig. 4, the train is held stationary by the bar $c^2$ resting against the balance-wheel F. When the stem H is pushed in once to its full limit, the ratchet and pin-wheel will be turned the distance of one tooth. The pin upon the wheel E, just behind the cam $d^3$, will run upon the cam and throw the lever D outwardly, releasing the heart-shaped cams $a'$ $b'$. At the same time the pin adjacent to the lever C will push that lever to one side, releasing the balance-wheel F and starting the timer. The stem H springs back to its original position, and the pawl engages another tooth of the ratchet-wheel. In this position the timer runs, registering the minutes and seconds, until it is desired to stop it, when the operator gives another push to the stem H. The lever C now drops from the pin against which it has been resting, throws the rod $c^2$ against the balance-wheel, and stops the train, leaving the hands fixed at the point reached when the train was stopped. There is no change in the position of the lever D, as the pin $e^2$ in contact with the cam $d^3$ has run along the face of the cam, holding it out and preventing its stops from dropping upon the heart-shaped cams when the second push was given. A third push is given to the stem H, the pin $e^2$ passes the end of the cam $d^3$, the lever D drops, the stops J and K are brought into contact with the heart-shaped cams, and the hands returned to zero. During this movement the bar $c^2$ still rests upon the balance-wheel, as the lever C is not brought in contact with another pin to throw it out. This arrangement also enables us to use a timer regulated to run a short time. As the train is in motion only during the period the time is being registered, many trials may be made without rewinding. The bar $c^2$ may of course be arranged to be brought in contact with any part of the train to stop its movement, as well as against the balance-wheel.

Figs. 8 and 9 show a modified form of our device, which consists of attaching rigidly to the upper side of the cams disks the edges of which are serrated. The lever C is provided with two knife-edge stops, $c^2$ $c^2$, which engage the edges of these disks and stop the hands and hold them stationary. It is sometimes desirable to allow the time-train to run continuously and not to be stopped every time the hands are stopped and reset. To supply this need this device is designed. When the first push is given to the stem H, both levers C and D are pushed out of engagement with the cams and the serrated disks, and they, with the hands, being unrestrained, are revolved by the hand-arbor turning in the center. When a second push is given to the stem, the knife-edge stops $c^2$ $c^2$ drop upon the serrated disks and stop the hands, disks, and cams. The arbor, however, continues to turn within them. The third push raises the lever C and stops $c^2$ $c^2$ from the disks and drops the lever D and stops J and K upon the cams, resetting them and the hands to zero. In this position the hands, disks, and cams are held stationary by the lever D, C being still out of engagement with the disks; but the train continues to run notwithstanding.

Having described our invention, what we desire to secure by Letters Patent is—

1. In a timer, the wheel E, provided with the pins $e^2$, in combination with the lever C and bar $c^2$, attached thereto, and balance-wheel F, substantially as described.

2. In a timer, the heart-shaped cams $a'$ $b'$, mounted upon the hand-spindles A and B, and the pivoted lever D, having the stops J and K mounted thereon and arranged to be adjusted in line with a cross-section of the lever D, in combination with a push-rod, as H, and intermediate mechanism for operating said lever.

3. In a timer, the heart-shaped cams $a'$ $b'$, mounted upon the hand-spindles A and B, in combination with the lever D, having the stops J and K mounted thereon and arranged to be adjusted vertically and laterally.

4. In a timer, the wheel E, provided with the pins $e^2$, in combination with the lever D, having the cam $d^3$ and the stops J and K mounted thereon adjustably in line with the lever D, and also in line with the cross-section thereof, substantially as described.

5. In a timer, the wheel E and pins $e^2$, in combination with the lever C, provided with the arm $c^2$, for stopping the train, and lever D, provided with cam $d^3$ and stops J and K, for recoiling the hands, substantially as described.

6. In a timer, the wheel E and pins $e^2$, in combination with the lever C, provided with the extension $c^2$, the lever D, provided with cam $d^3$ and stops J and K, and the time-train.

7. In a timer, the combination of the arbor A, provided with a shoulder or collar, $a$, and threaded on its upper end, with the cam $a'$, having the offset $a$, in the upper end of which a socket is sunk, and a spiral spring inserted in said socket, and a nut screwed onto the end of the arbor, so as to exert a varying pressure upon the spiral spring, substantially as described.

HARRY A. LEONARD.
GOVER KETTLEWELL.

Witnesses:
W. M. EMMAR,
C. R. GALLAGHER.